United States Patent
Kim et al.

(10) Patent No.: US 12,451,500 B2
(45) Date of Patent: Oct. 21, 2025

(54) HYDROGEN STORAGE SYSTEM AND METHOD FOR ADJUSTING DIFFERENTIAL PRESSURE THEREIN

(71) Applicants: Hyundai Motor Company, Seoul (KR); Kia Corporation, Seoul (KR)

(72) Inventors: Jong Hee Kim, Hwaseong-si (KR); Jae Han Chung, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 460 days.

(21) Appl. No.: 17/983,880

(22) Filed: Nov. 9, 2022

(65) Prior Publication Data
US 2024/0006634 A1   Jan. 4, 2024

(30) Foreign Application Priority Data
Jun. 30, 2022  (KR) .................. 10-2022-0080652

(51) Int. Cl.
*H01M 8/04082* (2016.01)
*H01M 8/04089* (2016.01)

(52) U.S. Cl.
CPC ... *H01M 8/04216* (2013.01); *H01M 8/04104* (2013.01); *H01M 2250/20* (2013.01)

(58) Field of Classification Search
CPC ......... H01M 8/04216; H01M 8/04104; H01M 2250/20
See application file for complete search history.

(56) References Cited

U.S. PATENT DOCUMENTS

2008/0044704 A1   2/2008  Kubo et al.
2021/0126270 A1   4/2021  Min et al.

FOREIGN PATENT DOCUMENTS

| EP | 3144577 B | 3/2017 |
| JP | H06117266 A | 4/1994 |
| JP | 2004084808 A | 3/2004 |
| JP | 3960524 B2 | 8/2007 |
| JP | 5939131 B2 | 6/2016 |
| JP | 2021174728 A | 11/2021 |
| KR | 20120011683 A | 2/2012 |

*Primary Examiner* — Sarah A. Slifka
(74) *Attorney, Agent, or Firm* — Fish & Richardson P.C.

(57) ABSTRACT

A hydrogen storage system for detecting and restricting a pressure difference generated in the hydrogen storage system and a method for adjusting differential pressure therein are provided. The hydrogen storage system includes a controller that controls valves of a plurality of tanks. The controller measures pressure for each tank, measures a pipe pressure of pipe connected with the plurality of tanks, compares the pressure for each tank with the pipe pressure to determine whether differential pressure between the tank and the pipe is generated, determines whether it is expected to generate differential pressure between the tanks in an expected equilibrium temperature, when it is determined that the differential pressure between the tank and the pipe is not generated, and performs pressure equilibrium control between the tanks, when it is expected to generate the differential pressure between the tanks.

20 Claims, 11 Drawing Sheets

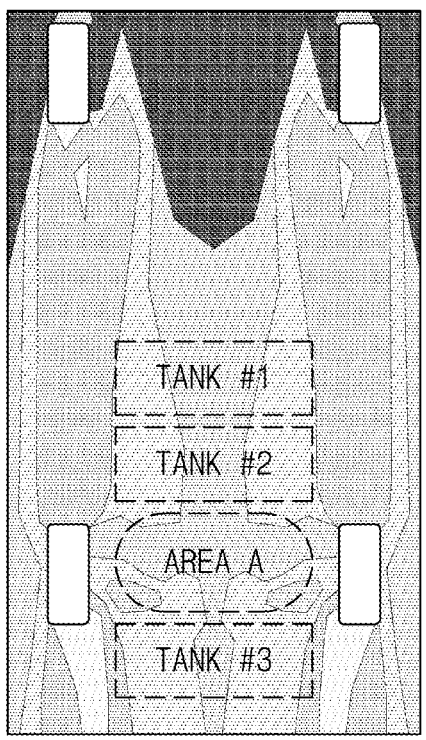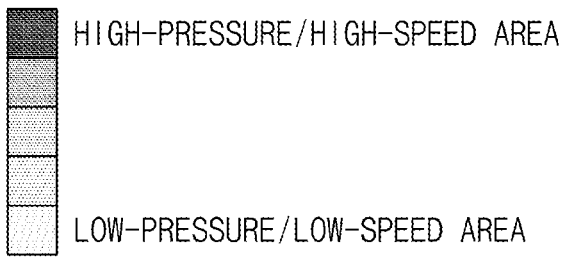
Fig.2

|  | TEMPERATURE [°C] | PRESSURE [bar] | EXPECTED PRESSURE @ OUTDOOR AIR TEMPERATURE | @ EXPECTED OUTDOOR AIR TEMPERATURE |
|---|---|---|---|---|
| TANK #1 | [MEASUREMENT] 3 | 208 [CALIBRATION] | 206 @ 1°C | 198 @ −10°C |
| TANK #2 | [MEASUREMENT] 1 | 208 [CALIBRATION] | 208 @ 1°C | 200 @ −10°C |
| TANK #3 | [MEASUREMENT] 3 | 208 [CALIBRATION] | 206 @ 1°C | 198 @ −10°C |
| TANK #4 | [MEASUREMENT] 6 | 208 [CALIBRATION] | 204 @ 1°C | 196 @ −10°C |
| TANK #5 | [MEASUREMENT] 9 | 208 [CALIBRATION] | 202 @ 1°C | 194 @ −10°C |
| TANK #6 | [MEASUREMENT] 13 | 208 [CALIBRATION] | 199 @ 1°C | 191 @ −10°C |
| TANK #N$^{th}$ | [MEASUREMENT] 12 | 208 [CALIBRATION] | 200 @ 1°C | 192 @ −10°C |
| PIPING | 10 [CALCULATION] | 208 [MEASUREMENT] | – | – |
| OUTDOOR AIR TEMPERATURE | 7 | 1bar [Ref] | – | – |

510 520

|  | TANK #1 | TANK #2 | TANK #3 | TANK #4 | TANK #5 | TANK #6 | TANK #N$^{th}$ |
|---|---|---|---|---|---|---|---|
| TANK #1 | – | 2 | 0 | −2 | −4 | −7 | −7 |
| TANK #2 | −2 | – | −2 | −4 | −6 | −9 | −8 |
| TANK #3 | 0 | 2 | – | −2 | −4 | −7 | −7 |
| TANK #4 | 2 | 4 | 2 | – | −2 | −5 | −4 |
| TANK #5 | 4 | 6 | 4 | 2 | – | −3 | −2 |
| TANK #6 | 7 | 9 | 7 | 5 | 3 | – | 1 |
| TANK #N$^{th}$ | 7 | 8 | 7 | 4 | 2 | −1 | – |

530

|  | EXPECTED PRESSURE | DIFFERENTIAL PRESSURE | ACTION |
|---|---|---|---|
| TANK #1 | 206 | Δ7 | UNNECESSARY |
| TANK #2 | 208 | Δ9 | NECESSARY |
| TANK #3 | 206 | Δ7 | UNNECESSARY |
| TANK #4 | 204 | Δ5 | UNNECESSARY |
| TANK #5 | 202 | Δ3 | UNNECESSARY |
| TANK #6 | 199 | 0 | UNNECESSARY |
| TANK #N$^{th}$ | 200 | Δ1 | UNNECESSARY |

Fig.5

HYDROGEN STORAGE SYSTEM AND METHOD FOR ADJUSTING DIFFERENTIAL PRESSURE THEREIN

CROSS-REFERENCE TO RELATED APPLICATION

This application claims the benefit of priority to Korean Patent Application No. 10-2022-0080652, filed in the Korean Intellectual Property Office on Jun. 30, 2022, the entire contents of which are incorporated herein by reference.

TECHNICAL FIELD

The present disclosure relates to a hydrogen storage system for detecting and restricting a pressure difference generated in the hydrogen storage system and a method for adjusting differential pressure therein.

BACKGROUND

A hydrogen storage system safely stores hydrogen used as fuel by a fuel cell vehicle and supplies hydrogen to a fuel cell stack when driving a fuel cell system. A pressure difference (or a pressure deviation or differential pressure) between parts may be generated in such a hydrogen storage system. Thus, an existing technology separately add a mechanical device such that the hydrogen storage system may operate even in a condition where the pressure difference is generated or supplements existing operation performance (or a solenoid valve electric force or the like). However, in this case, cost and weight increase and the structure becomes more complex. Furthermore, it is impossible for the structural and performance supplement method to ensure redundancy and perform a fail-safe operation when differential pressure greater than expected is generated.

SUMMARY

The present disclosure has been made to solve the above-mentioned problems occurring in the prior art while advantages achieved by the prior art are maintained intact.

An aspect of the present disclosure provides a hydrogen storage system for identifying a temperature and pressure for each part of the system while the fuel cell is operating, independently controlling a value for each tank before the operation of the fuel cell is ended when differential pressure in the system is detected and expected, and relieving differential pressure by releasing hydrogen through a regulator and a method for adjusting differential pressure therein.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hydrogen storage system may include a controller that controls valves of a plurality of tanks. The controller may measure pressure for each tank, may measure a pipe pressure of pipe connected with the plurality of tanks, may compare the pressure for each tank with the pipe pressure to determine whether differential pressure between the tank and the pipe is generated, may determine whether it is expected to generate differential pressure between the tanks in an expected equilibrium temperature, when it is determined that the differential pressure between the tank and the pipe is not generated, and may perform pressure equilibrium control between the tanks, when it is expected to generate the differential pressure between the tanks.

The controller may measure a temperature for each tank using a temperature sensor mounted on each of the plurality of tanks and may convert the temperature for each tank into the pressure for each tank using a temperature-pressure conversion formula.

The controller may determine that the differential pressure between the tank and the pipe is generated, when a pressure difference between at least one of the plurality of tanks and the pipe is greater than or equal to predetermined reference pressure, and may determine that the differential pressure between the tank and the pipe is not generated, when the pressure difference between each of the plurality of tanks and the pipe is less than the reference pressure.

The controller may perform a process of opening and closing a valve mounted on the at least one tank during a predetermined time at least once, when it is determined that the differential pressure between the tank and the pipe is generated, to adjust pressures of the at least one tank and the pipe to be the same as each other.

The controller may independently control values in an order of a tank with a relatively low temperature and high pressure and a tank with a relatively high temperature and low pressure, when there are two or more tanks in which the differential pressure with the pipe is generated, to adjust pressures of the tanks and the valves to be the same as each other.

The controller may calculate a temperature for each tank in the expected equilibrium temperature, may calculate a pressure difference between the tanks based on the temperature for each tank in the expected equilibrium temperature, may determine whether the calculated pressure difference is greater than or equal to target differential pressure, may determine that it is expected to generate the differential pressure between the tanks, when the calculated pressure difference is greater than or equal to the target differential pressure, and may determine that it is expected not to generate the differential pressure between the tanks, when the calculated pressure difference is less than the target differential pressure.

The controller may independently control a valve of a tank in which relatively high pressure is expected among the tanks in which the differential pressure is generated and may release hydrogen, when it is determined that it is expected to generate the differential pressure between the tanks, and may perform turn-off, when it is determined that it is expected not to generate the differential pressure between the tanks.

The controller may determine whether a start delay time is greater than a predetermined reference time, upon restart after the turn-off, and may maintain the target differential pressure, when the start delay time is not greater than the reference time.

The controller may determine whether an outside air temperature reaches the expected equilibrium temperature, when the start delay time is greater than the reference time, may reinforce the target differential pressure, when the outside air temperature reaches the expected equilibrium temperature, and may relieve the target differential pressure, when the outside air temperature does not reach the expected equilibrium temperature.

The controller may set a forecast outside air temperature of a parked area or a statistically predicted outside air temperature learned based on a user pattern to the expected equilibrium temperature.

The controller may measure the pressure for each tank using a pressure sensor mounted on each of the plurality of tanks.

According to another aspect of the present disclosure, a method for adjusting differential pressure in a hydrogen storage system may include closing, by a controller, valves of a plurality of tanks, when receiving a turn-off signal, measuring, by the controller, pressure for each tank, measuring, by the controller, a pipe pressure of pipe connected with the plurality of tanks, comparing, by the controller, the pressure for each tank with the pipe pressure to determine whether differential pressure between the tank and the pipe is generated, determining, by the controller, whether it is expected to generate differential pressure between the tanks in an expected equilibrium temperature, when it is determined that the differential pressure between the tank and the pipe is not generated, and performing, by the controller, pressure equilibrium control between the tanks, when it is expected to generate the differential pressure between the tanks.

The measuring of the pressure for each tank may include measuring, by the controller, a temperature for each tank using a temperature sensor mounted on each of the plurality of tanks and converting, by the controller, the temperature for each tank into the pressure for each tank using a temperature-pressure conversion formula.

The determining of whether the differential pressure between the tank and the pipe is generated may include determining, by the controller, that the differential pressure between the tank and the pipe is generated, when a pressure difference between at least one of the plurality of tanks and the pipe is greater than or equal to predetermined reference pressure, and determining, by the controller, that the differential pressure between the tank and the pipe is not generated, when the pressure difference between each of the plurality of tanks and the pipe is less than the reference pressure.

The determining of whether the differential pressure between the tank and the pipe is generated may further include performing, by the controller, a process of opening and closing a valve mounted on the at least one tank during a predetermined time at least once, when it is determined that the differential pressure between the tank and the pipe is generated, to adjust pressures of the at least one tank and the pipe to be the same as each other differential pressure.

The adjusting of the pressures of the at least one tank and the values to be same as each other may include independently controlling, by the controller, values in an order of a tank with a relatively low temperature and high pressure and a tank with a relatively high temperature and low pressure, when there are two or more tanks in which the differential pressure with the pipe is generated, to adjust pressures of the tanks and the valves to be the same as each other differential pressure.

The determining of whether it is expected to generate the differential pressure between the tanks in the expected equilibrium temperature may include calculating, by the controller, a temperature for each tank in the expected equilibrium temperature, calculating, by the controller, a pressure difference between the tanks based on the temperature for each tank in the expected equilibrium temperature, determining, by the controller, whether the calculated pressure difference is greater than or equal to target differential pressure, determining, by the controller, that it is expected to generate the differential pressure between the tanks, when the calculated pressure difference is greater than or equal to the target differential pressure, and determining, by the controller, that it is expected not to generate the differential pressure between the tanks, when the calculated pressure difference is less than the target differential pressure.

The determining of whether it is expected to generate the differential pressure between the tanks in the expected equilibrium temperature may further include independently controlling, by the controller, a valve of a tank in which high pressure is relatively expected among the tanks in which the differential pressure is generated and releasing, by the controller, hydrogen, when it is determined that it is expected to generate the differential pressure between the tanks, and performing, by the controller, turn-off, when it is determined that it is expected not to generate the differential pressure between the tanks.

The determining of whether it is expected to generate the differential pressure between the tanks in the expected equilibrium temperature may further include determining, by the controller, whether a start delay time is greater than a predetermined reference time, upon restart after the turn-off, and maintaining, by the controller, the target differential pressure, when the start delay time is not greater than the reference time.

The determining of whether it is expected to generate the differential pressure between the tanks in the expected equilibrium temperature may further include determining, by the controller, whether an outside air temperature reaches the expected equilibrium temperature, when the start delay time is greater than the reference time, reinforcing, by the controller, the target differential pressure, when the outside air temperature reaches the expected equilibrium temperature, and relieving, by the controller, the target differential pressure, when the outside air temperature does not reach the expected equilibrium temperature.

The determining of whether it is expected to generate the differential pressure between the tanks in the expected equilibrium temperature may include setting a forecast outside air temperature of a parked area or a statistically predicted outside air temperature learned based on a user pattern to the expected equilibrium temperature.

The measuring of the pressure for each tank may include measuring the pressure for each tank using a pressure sensor mounted on each of the plurality of tanks.

BRIEF DESCRIPTION OF THE DRAWINGS

The above and other objects, features and advantages of the present disclosure will be more apparent from the following detailed description taken in conjunction with the accompanying drawings:

FIG. 2 is a drawing illustrating an aerodynamic characteristic of a vehicle associated with the present disclosure;

FIG. 5 is a drawing for describing a process of predicting the generation of differential pressure between tanks according to an implementation of the present disclosure;

DETAILED DESCRIPTION

Figure 1:
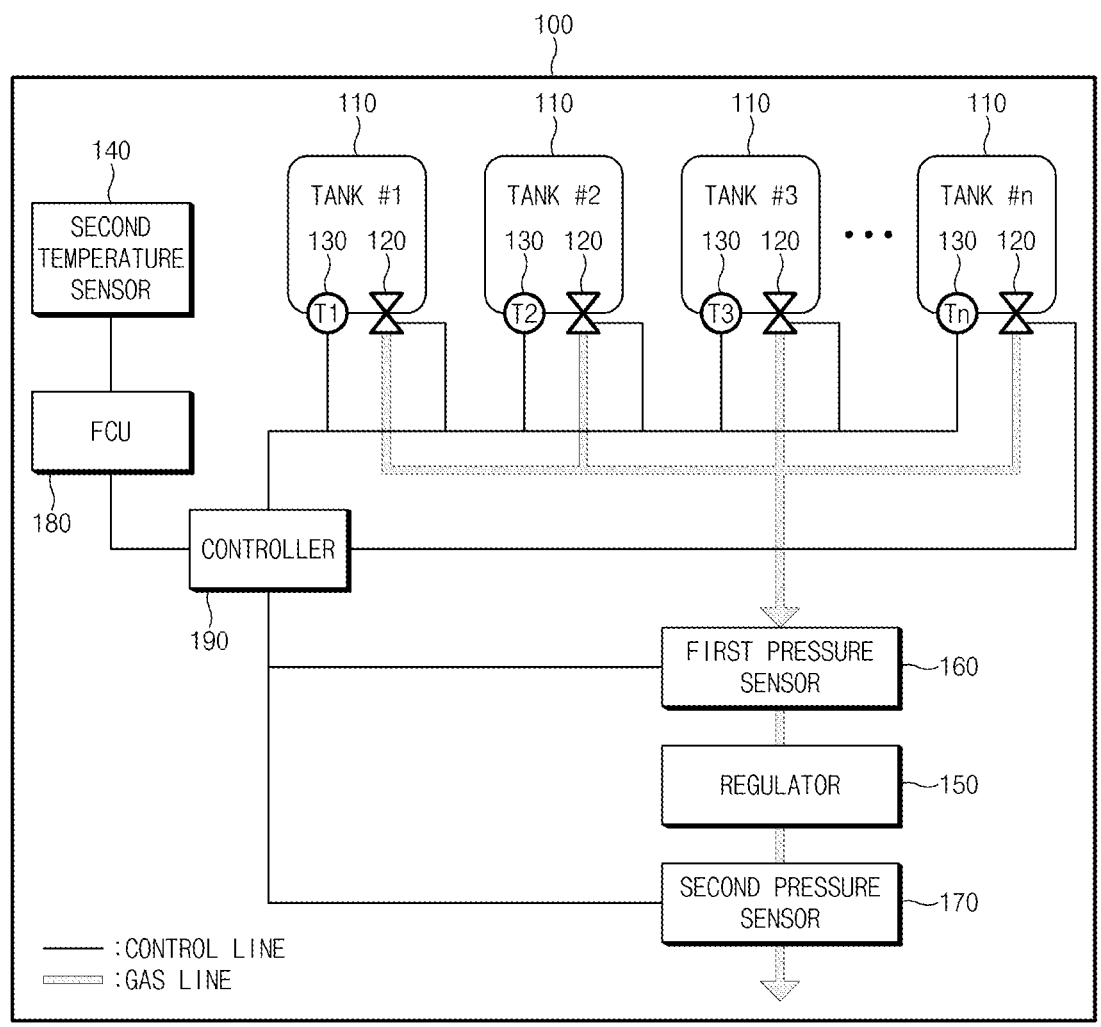
FIG. 1 is a drawing illustrating a configuration of a hydrogen storage system according to an implementation of the present disclosure.

Hereinafter, some implementations of the present disclosure will be described in detail with reference to the exemplary drawings. In the drawings, the same reference numerals will be used throughout to designate the same or equivalent elements.

FIG. 1 is a drawing illustrating a configuration of a hydrogen storage system according to implementations of the present disclosure.

A hydrogen storage system 100 may be loaded into a fuel cell vehicle to supply hydrogen used as fuel when a fuel cell stack generates electrical energy. The hydrogen storage system 100 may include a tank 110, a valve 120, a first temperature sensor 130, a second temperature sensor 140, a regulator 150, a first pressure sensor 160, a second pressure sensor 170, a fuel cell control unit (FCU) 180, and a controller 190.

The tank 110 may store hydrogen used as fuel in the fuel cell vehicle. The tank 110 may store hydrogen gas compressed at high pressure. The tank 110 may be made of a carbon fiber reinforced composite capable of withstanding high pressure. The tank 110 may be provided in plural in the hydrogen storage system 100.

The valve 120 may open or block a flow path of hydrogen gas supplied from the tank 110 to a fuel cell stack. The valve 120 may be a tank valve mounted on an outlet end of the tank 110, which may be closed or opened under an instruction of the controller 190. The valve 120 may be implemented as a solenoid valve.

The first temperature sensor 130 may be installed in the tank 110 to measure a temperature (or a hydrogen temperature) of hydrogen stored in the tank 110. The first temperature sensor 130 may transmit the measured temperature information to the controller 190. The first temperature sensor 130 may receive continuous power.

The second temperature sensor 140 may measure an outdoor air temperature. In other words, the second temperature sensor 140 may be installed in the vehicle to measure an external temperature of the vehicle.

The regulator 150 may reduce high-pressure (e.g., 700 bar) hydrogen gas, output from the at least one tank 110, to predetermined low-pressure hydrogen gas. The regulator 150 may be implemented as a high pressure regulator (HPR). The regulator 150 may supply the reduced hydrogen to the fuel cell stack.

The first pressure sensor 160 may be mounted on pipe (or a fuel supply line) which connects the plurality of tanks 110 with the regulator 150. The first pressure sensor 160 may measure a pressure of hydrogen in the pipe. In other words, the first pressure sensor 160 may measure a pressure of hydrogen (or hydrogen pressure) introduced into the regulator 150. The first pressure sensor 160 may be implemented as a high pressure regulator (HPS).

The second pressure sensor 170 may be mounted on pipe connected with an output side of the regulator 150. The second pressure sensor 170 may measure a pressure of hydrogen, which is reduced by the regulator 150. The second pressure sensor 170 may be implemented as a mid pressure regulator (MPS).

The FCU 180 may control the overall operation of the fuel cell system. The FCU 180 may transmit a vehicle start (or vehicle turn-on) signal (or command) and a vehicle turn-off (or stop) signal (or command) to the controller 190. The FCU 180 may measure an outside air temperature using the second temperature sensor 140. The FCU 180 may transmit the measured outside air temperature to the controller 190. The FCU 180 may include at least one processor and may further include a memory.

The controller 190 may control the overall operation of the hydrogen storage system 100. The controller 190 may be a hydrogen storage system management unit (HMU). The controller 190 may calculate a state of fuel (SOF), a temperature inside and outside the system, a pressure situation, and a pressure deviation. The controller 190 may calculate an SOF using a temperature and pressure of hydrogen and may calculate a temperature and pressure of a tank and pipe area. The controller 190 may calculate an SOF using the mass of hydrogen. Furthermore, the controller 190 may calculate pressure inside and outside the system and the SOF based on a change in hydrogen temperature.

The controller 190 may include at least one processor. The at least one processor may include at least one of processing devices such as an application specific integrated circuit (ASIC), a digital signal processor (DSP), a programmable logic device (PLD), a field programmable gate array (FPGA), a central processing unit (CPU), a microcontroller, or a microprocessor. Furthermore, the controller 190 may include a memory. The memory may be a non-transitory storage medium which stores instructions executed by the at least one processor. The memory may include at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM). The memory may store control logic for restricting differential pressure from being generated in the hydrogen storage system 100.

The controller 190 may compare amounts of states of the hydrogen storage system 100 when the starting of the fuel cell is turned off to determine whether differential pressure is generated and may predict a possibility that differential pressure will be generated to induce pressure equilibrium. At this time, there should be no failure in pressure sensor, tank valve, and temperature sensor, and the SOF, that is, the remaining amount of hydrogen should be greater than or equal to a predetermined certain level. Herein, the certain level may be a level of an SOF capable of being guaranteed with regard to a sensor error, for example, an SOF of 10%.

The controller 190 may identify a temperature and a high-pressure sensor for each tank when a vehicle turn off signal is received and may calculate a pressure difference between the tank and the pipe. The controller 190 may predict (or expect) differential pressure between tanks upon temperature equilibrium before next start based on the outside air temperature. When the predicted differential pressure between the tanks is in a valve opening impossible condition upon next driving, the controller 190 may operate the valve 120 and the regulator 150 to perform pressure equilibrium and may induce turn-off.

In detail, the controller 190 may receive a turn-off signal (or a stop signal) from the FCU 180. When the start-off signal is received, the controller 190 may perform a predetermined turn-off process. In other words, the controller 190 may stop supplying fuel (or hydrogen) to the fuel cell stack depending on the turn-off process. At this time, the controller 190 may output (or display) a notification for notifying a user of it to a cluster. For example, the controller 190 may output the message "Preparing to turn off, complete after ○○ seconds" to the cluster.

Furthermore, the controller 190 may switch the valves 120 respectively mounted on the tanks 110 from an open state to a closed state. In other words, when receiving the turn-off signal, the controller 190 may close the opened valves 120.

The controller 190 may measure a temperature for each tank using the first temperature sensor 130. The controller 190 may calculate pressure for each tank using the measured temperature for each tank. At this time, the controller 190 may convert a tank temperature into tank pressure using a temperature-pressure conversion formula.

The controller 190 may measure pipe pressure using the first pressure sensor 160.

The controller 190 may compare the pressure for each tank with the pipe pressure to determine whether to execute the re-formation of the same pressure. Herein, the re-formation of the same pressure may be defined as pressure equilibrium control of matching the tank pressure with the pipe pressure to be the same as each other. When a pressure difference between the at least one of the plurality of tanks 110 and the pipe is greater than or equal to predetermined reference pressure (e.g., 5 bar), the controller 190 may determine to execute the re-formation of the same pressure. When the pressure difference is less than the reference pressure, the controller 190 may determine not to execute the re-formation of the same pressure. Herein, the pressure difference may be a value obtained by subtracting the pipe pressure from the tank pressure.

When it is determined to execute the re-formation of the same pressure, the controller 190 may open the valve 120 of the tank 110, in which the difference over the reference pressure with the pipe pressure is generated, during a predetermined time (e.g., 3 seconds) to execute the re-formation of the same pressure. At this time, the controller 190 may execute the re-formation of the same pressure in an order from a tank having relatively low temperature and high pressure and a tank having relatively high temperature and low pressure. After executing the re-formation of the same pressure, the controller 190 may close the tank valve.

The controller 190 may calibrate and store the temperature-pressure conversion formula using the values measured by the first temperature sensor 130 and the first pressure sensor 160. When drift occurs in at least one of the first temperature sensor 130 or the first pressure sensor 160, the controller 190 may reflect (or apply) the amount of drift as a calibration value in the temperature-pressure conversion formula to calibrate the temperature-pressure conversion formula. The controller 190 may store the calibrated temperature-pressure conversion formula in the memory.

The controller 190 may determine whether it is expected to generate differential pressure between tanks on the basis of the expected equilibrium temperature (e.g., the outdoor air temperature). The controller 190 may determine whether the expected differential pressure between tanks is less than predetermined target differential pressure (15 bar) in the expected equilibrium temperature. Herein, the expected equilibrium temperature may be a temperature expected to be temperature equilibrium of hydrogen gas in the hydrogen storage system 100. A drift value C compared to a forecast outside air temperature A of a parked area/a statistically predicted outside air temperature B learned based on a usage pattern with regard to A, B, or insulation and heat conduction of the system itself may be used as the expected equilibrium temperature. When there is a long time until restart after a shutdown (S/D), C may be equal to A or may be equal to B. The controller 190 may set an initial setting value of the target differential pressure to 20% or less of an actual management goal (i.e., a hardware drivable range) to learn a direction where the target differential pressure is completed (or high).

When the expected differential pressure is less than the target differential pressure, the controller 190 may perform turn-off and may output a notification for notifying the user of the turn-off to the cluster. For example, the controller 190 may display the message "The engine is off." on the cluster.

Thereafter, upon restart, the controller 190 may determine whether a start delay time is greater than a predetermined reference time (e.g., 2 seconds). When the start delay time is not greater than the reference time, the controller 190 may maintain the target differential pressure.

When the start delay time is greater than the predetermined reference time, the controller 190 may determine whether the outside air temperature reaches the expected equilibrium temperature upon restart.

When it is determined that the outside air temperature reaches the expected equilibrium temperature upon the restart, the controller 190 may reinforce the target differential pressure. At this time, the controller 190 may set the target differential pressure to be lower than current target differential pressure.

When it is determined that the outside air temperature does not reach the expected equilibrium temperature upon the restart, the controller 190 may relieve the target differential pressure. At this time, the controller 190 may set the target differential pressure to be higher than the current target differential pressure.

Figure 3:
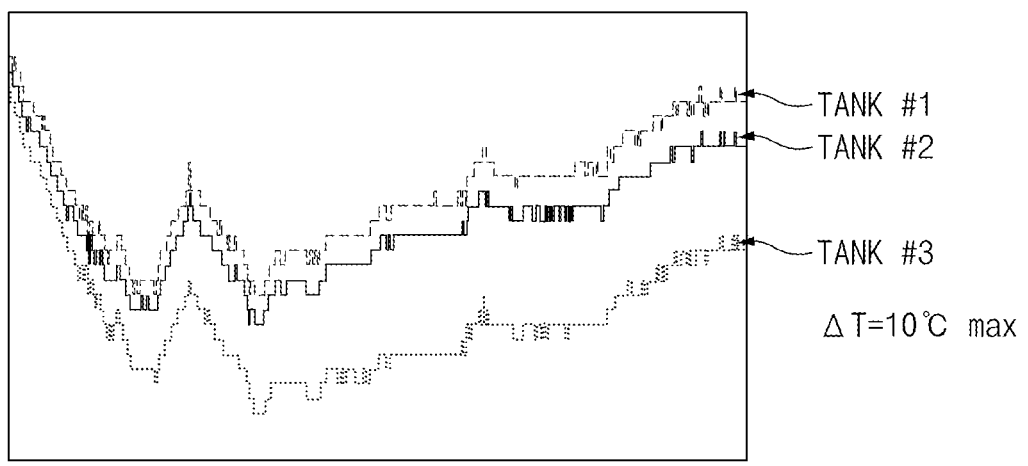
FIG. 3 is a graph illustrating a change in temperature in a tank associated with the present disclosure.

FIG. 2 is a drawing illustrating an aerodynamic characteristic of a vehicle associated with the present disclosure. FIG. 3 is a graph illustrating a change in temperature in a tank associated with the present disclosure.

As shown in FIG. 2, three hydrogen tanks may be mounted around a rear wheel axle of a vehicle. In this case, when the vehicle travels, an aerodynamic high-pressure and high-speed area may be generated in area A. Tank #3 may be cooled due to the aerodynamic high-pressure and high-speed area.

A temperature in the tank may change due to aerodynamics while the vehicle is traveling, and a temperature difference between tanks may occur due to this. As shown in FIG. 3, tank #1 has the highest internal temperature, tank #2 has the next highest internal temperature, and tank #3 has the lowest internal temperature.

Figure 4:
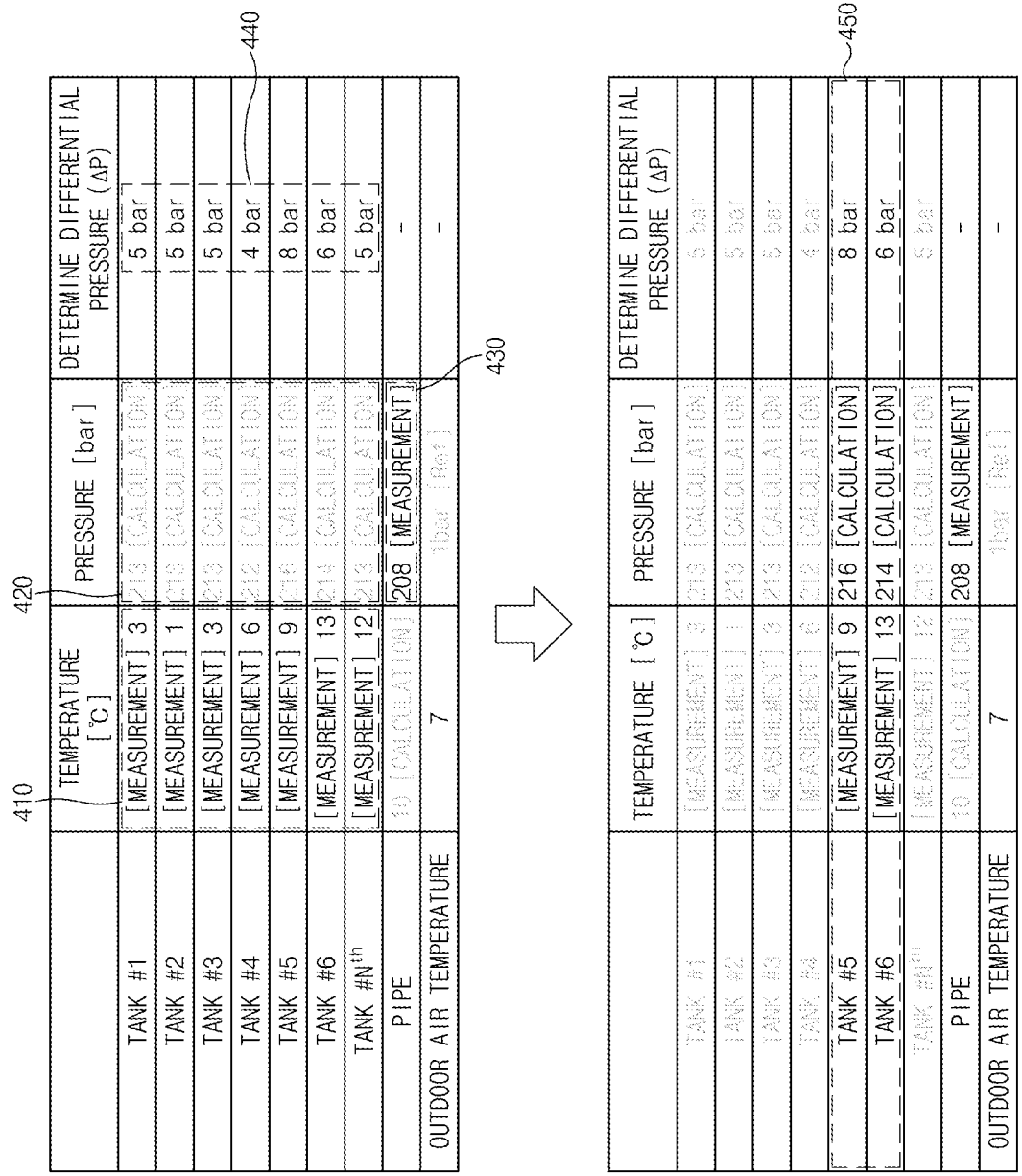
FIG. 4 is a drawing for describing the calibration of a temperature-pressure conversion formula according to an implementation of the present disclosure.

FIG. 4 is a drawing for describing the calibration of a temperature-pressure conversion formula according to an implementation of the present disclosure.

A controller 190 of FIG. 1 may measure a temperature 410 for each tank using a first temperature sensor 130 of FIG. 1 immediately after turn-off. The controller 190 may calculate pressure 420 for each tank using the measured temperature for each tank.

Furthermore, the controller 190 may measure pipe pressure 430 using a first pressure sensor 160 of FIG. 1.

The controller 190 may calculate differential pressure 440 between each tank pressure and the pipe pressure. The controller 190 may select a tank in which the calculated differential pressure is greater than predetermined reference differential pressure (e.g., 0 bar). For example, the controller 190 may determine that differential pressure between the tank and the pipe is not generated, when the calculated differential pressure is less than or equal to 5 bar, and may determine that the differential pressure between the tank and the pipe is generated, when the calculated differential pressure is greater than 5 bar.

The controller 190 may estimate tank #5 and tank #6 as tanks 450 in which the differential pressure with the pipe is generated. The controller 190 may open and close tank valves of tank #5 and tank #6 during a predetermined time (e.g., 3 seconds) and may remeasure internal temperatures of tank #5 and tank #6 using temperature sensors respectively installed in tank #5 and tank #6. At this time, the controller 190 may independently control the tank valves of tank #5 and tank #6. In detail, the controller 190 may open and close the valve of tank #5 during the predetermined time to remeasure the internal temperature of tank #5 and may open and close the valve of tank #6 during the predetermined time to remeasure the internal temperature of tank #6.

When there is no change in temperature as a result of the remeasurement, the controller 190 may determine that sensor drift occurs (that there is no differential pressure between the tank and the pipe). The controller 190 may calibrate differential pressure when predicting the differential pressure later by the amount of sensor drift. In other words, the controller 190 may reflect the amount of sensor drift as a calibration value in the temperature-pressure conversion formula and may calibrate the temperature-pressure conversion formula. Thereafter, the controller 190 may store the calibrated temperature-pressure conversion formula in a memory.

Meanwhile, when there is a change in temperature as a result of the remeasurement, the controller 190 may determine that there is differential pressure between the tank and the pipe. In this case, the controller 190 may repeatedly open and close a tank valve until there is no change in temperature.

As another implementation, when performing calibration by means of a valve open and close control for all of a plurality of tanks, the controller 190 may apply reference differential pressure as a default value (e.g., 1 bar).

FIG. 5 is a drawing for describing a process of predicting the generation of differential pressure between tanks according to an implementation of the present disclosure.

A controller 190 of FIG. 1 may measure a temperature for each tank in a state where pressures of a plurality of tanks and pipe are calibrated to be the same as each other. The controller 190 may predict pressure 510 for each tank at a current outside air temperature of 1° C. At this time, the controller 190 may predict pressure for each tank using an ideal gas equation.

Furthermore, the controller 190 may expect (or predict) an outside air temperature upon next start (ore restart) and may predict pressure 520 for each tank at the expected outside air temperature (i.e., an expected equilibrium temperature). When it is possible to use communication and location information (e.g., when it is possible to obtain weather forecast information using telematics and location information using a GPS), the controller 190 may set a minimum temperature forecast with respect to a parking area in an expected restart time to an expected equilibrium temperature. As another example, the controller 190 may learn a user start and stop pattern and an outside air temperature to identify a probability distribution and may predict an outside air temperature in an expected restart time to set the predicted outside air temperature to an expected equilibrium temperature.

The controller 190 may calculate expected differential pressure 530 between tanks at the expected outside air temperature. When the calculated differential pressure is greater than a reference value (i.e., target differential pressure) for determining action, the controller 190 may determine that there is a need to take action. As an example, when the target differential pressure is set to 7.5 bar, the controller 190 may determine that it is expected to generate differential pressure in tank #2. At this time, the controller 190 may exhaust hydrogen in tank #2 to take action of a pressure of tank #2 from 208 bar to 203 bar, thus restricting differential pressure from being generated. As another example, when the target differential pressure is set to 5.5 bar, the controller 190 may determine that it is expected to generate differential pressure in tank #1, tank #2, and tank #3. The controller 190 may exhaust hydrogen in an order of tank #2, tank #1, and tank #3 to take action of (or adjust) a pressure of each tank to 203 bar, thus restricting differential pressure from being generated. However, the action pressure may be limited to range pressure where there is no start delay when control logic is aborted due to early restart. In other words, the action pressure may be limited to be greater than artificially generated differential pressure after taking action of expected differential pressure before taking action.

As another implementation, when the control logic is aborted due to early restart before an expected equilibrium temperature is reached, the controller 190 may identify converged temperature and pressure compared to an expected value and may use the identified temperature and pressure for restart and outside air temperature prediction learning.

Figure 6:
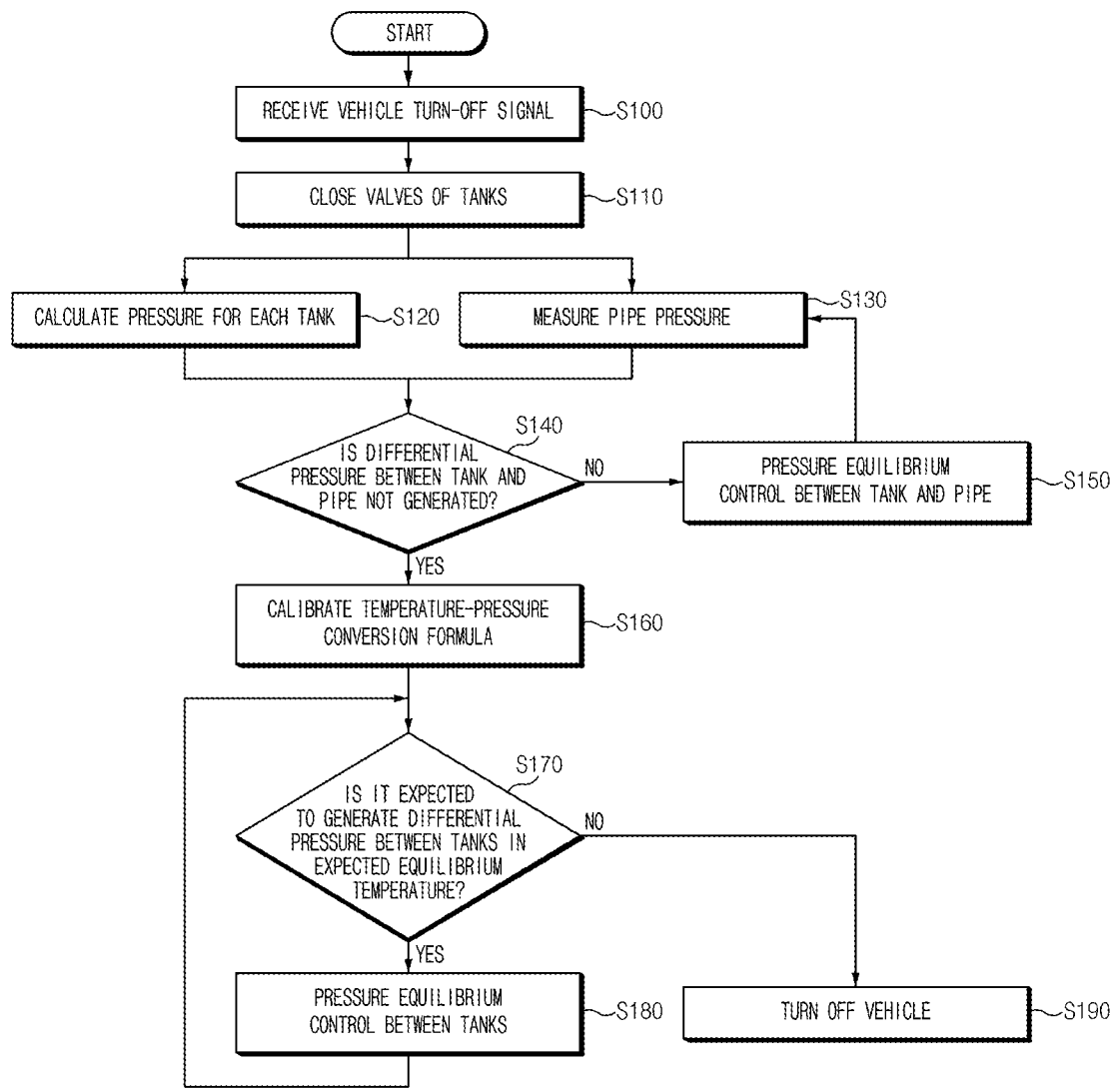
FIG. 6 is a flowchart illustrating a method for adjusting differential pressure in a hydrogen storage system according to an implementation of the present disclosure.

FIG. 6 is a flowchart illustrating a method for adjusting differential pressure in a hydrogen storage system according to implementations of the present disclosure.

In S100, a controller 190 of FIG. 1 may receive a turn-off signal transmitted from an FCU 180 of FIG. 1. When the turn-off signal is received, the controller 190 may output a notification for notifying a user of it to a cluster. For example, the controller 190 may display the message "Preparing to turn off, complete after ○○ seconds" on the cluster.

When the turn-off signal is received, in S110, the controller 190 may close valves 120 of a plurality of tanks 110 of FIG. 1. In other words, the controller 190 may switch the valves 120 of the plurality of tanks 110 from an open state to a closed state.

In S120, the controller 190 may measure a temperature for each tank using a first temperature sensor 130 installed on each tank 110 and may calculate pressure for each tank using the measured temperature. In other words, the controller 190 may convert the temperature for each tank, which is measured by the first temperature sensor 130, into pressure for each tank, using a temperature-pressure conversion formula.

In S130, the controller 190 may measure pipe pressure using a first pressure sensor 160 of FIG. 1, which is installed in pipe.

In S140, the controller 190 may compare a pressure of each tank 110 with a pressure of the pipe to determine whether differential pressure between the tank and the pipe is generated. In other words, the controller 190 may compare a pressure of each tank 110 with a pressure of the pipe to determine whether to execute the re-formation of the same pressure (or pressure equilibrium control) between the tank and the pipe. When differential pressure between at least one of the plurality of tanks 110 and the pipe is greater than or equal to predetermined reference pressure (e.g., 5 bar), the controller 190 may determine that the differential pressure between the tank and the pipe is generated to determine to execute the re-formation of the same pressure. When the differential pressure is less than the reference pressure, the controller 190 may determine that the differential pressure between the tank and the pipe is not generated to determine not to execute the re-formation of the same pressure. Herein, the differential pressure may be a value obtained by subtracting the pipe pressure from the tank pressure.

When it is determined that the differential pressure between the tank and the pipe is generated, in S150, the controller 190 may independently control a value of the tank in which the differential pressure with the pipe is generated to execute the re-formation of the same pressure (or the pressure equilibrium control). At this time, the controller 190 may execute the re-formation of the same pressure in an order from a tank having relatively low temperature and high pressure and a tank having relatively high temperature and low pressure. At this time, the controller 190 may open and close a tank valve during a predetermined time.

In S160, the controller 190 may calibrate the temperature-pressure conversion formula based on the temperature for each tank and pipe pressure, which are measured by a temperature sensor and a pressure sensor. The controller 190 may store the calibrated temperature-pressure conversion formula in a memory.

In S170, the controller 190 may determine whether it is expected to generate differential pressure between tanks in an expected equilibrium temperature. The controller 190 may determine whether the expected differential pressure between tanks is less than predetermined target differential pressure (15 bar) in the expected equilibrium temperature. Herein, the expected equilibrium temperature may be a temperature expected to be temperature equilibrium of gas in the system. A drift value C compared to a forecast outside air temperature A of a parked area/a statistically predicted outside air temperature B learned based on a usage pattern with regard to A, B, or insulation and heat conduction of the system itself may be used as the expected equilibrium temperature. When there is a long time until restart after a shutdown (S/D), C may be equal to A or may be equal to B.

When it is expected to generate the differential pressure between the tanks in the expected equilibrium temperature, in S180, the controller 190 may execute pressure equilibrium control between tanks. When the expected differential pressure is greater than or equal to the target differential pressure, the controller 190 may open a valve 120 of a tank expected to generate differential pressure between tanks (or a tank having relatively high pressure among tanks in which differential pressure is generated) and may operate a regulator 150 of FIG. 1 to exhaust (or release) hydrogen of the tank, thus restricting differential pressure from being generated.

When it is expected not to generate the differential pressure between the tanks in the expected equilibrium temperature, in S190, the controller 190 may execute turn-off. When the expected differential pressure is less than the target differential pressure, the controller 190 may perform turn-off and may output a notification for notifying a user of the turn-off to the cluster. For example, the controller 190 may display the message "The engine is off." on the cluster.

Figure 7:
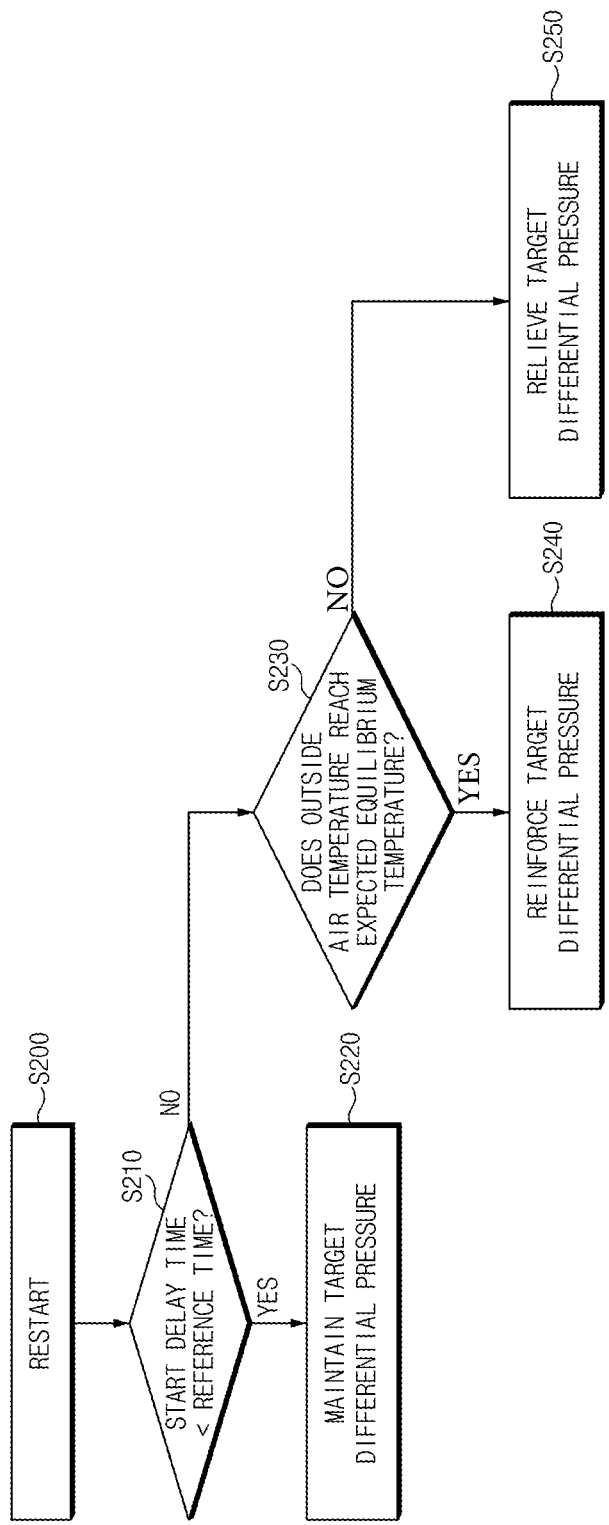
FIG. 7 is a flowchart illustrating a method for adjusting target differential pressure according to an implementation of the present disclosure.

FIG. 7 is a flowchart illustrating a method for adjusting target differential pressure according to implementations of the present disclosure.

When starting the next fuel cell after turning off the fuel cell, in S200, a controller 190 of FIG. 1 may receive a vehicle start signal from an FCU 180 of FIG. 1 to execute restart.

In S210, the controller 190 may determine a start delay time is greater than a predetermined reference time (or a target time) upon restart.

When the start delay time is not greater than the reference time, in S220, the controller 190 may maintain target differential pressure.

When the start delay time is greater than the predetermined reference time, in S230, the controller 190 may determine whether an outside air temperature reaches an expected equilibrium temperature upon restart.

When it is determined that the outside air temperature reaches the expected equilibrium temperature upon the restart, in S240, the controller 190 may reinforce the target differential pressure. In other words, the controller 190 may set the target differential pressure to be lower than current target differential pressure.

When it is determined that the outside air temperature does not reach the expected equilibrium temperature upon the restart, in S250, the controller 190 may relieve the target differential pressure. In other words, the controller 190 may set the target differential pressure to be higher than the current target differential pressure.

In the above-mentioned implementation, that the start delay time is greater than the reference time means that it fails to predict differential pressure. Thus, the controller 190 may adjust the target differential pressure based on whether the outside air temperature reaches the expected equilibrium temperature upon the restart. When the outside air temperature reaches the expected equilibrium temperature upon the restart, because the expected equilibrium temperature is well predicted, but because pressure prediction substantially fails, the controller 190 may reduce the target differential pressure to reinforce target differential pressure management. For example, when the target differential pressure is managed as 15 bar, but when a start delay is generated although the outside air temperature reaches the expected equilibrium temperature upon the restart, the controller 190 may decrease the target differential pressure to 10 bar to manage the decreased target differential pressure to restrict a start delay from being generated in a next situation.

Meanwhile, because that the outside air temperature does not reach the expected equilibrium temperature upon the restart corresponds to that being restarted within a specified time or that it deviates from the expected equilibrium temperature due to a change in weather, the controller 190 may increase the target differential pressure to relieve target differential pressure management. This is to minimize valve manipulation upon turn-off (or shutdown). For example, when the target differential pressure is managed as 15 bar, but when a start delay is generated due to noise although the outside air temperature does not reach the expected equilibrium temperature upon the restart, the controller 190 may change the target differential pressure to 20 bar to manage the changed target differential pressure.

Figure 8:
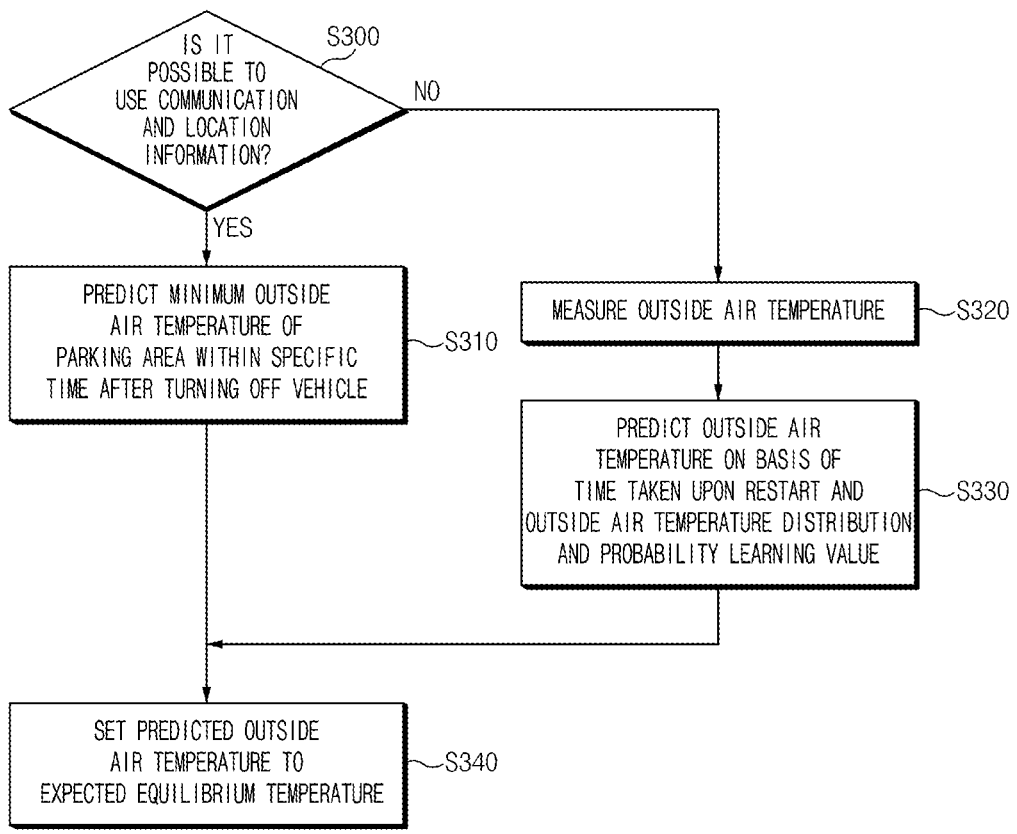
FIG. 8 is a flowchart illustrating a method for setting an expected equilibrium temperature according to an implementation of the present disclosure.
Figure 9:
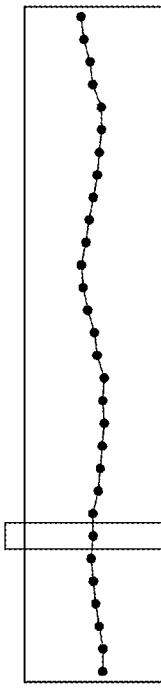
FIG. 9 is a drawing illustrating a restart time and an outside air temperature distribution and probability according to an implementation of the present disclosure.

FIG. 8 is a flowchart illustrating a method for setting an expected equilibrium temperature according to an implementation of the present disclosure. FIG. 9 is a drawing illustrating a restart time and an outside air temperature distribution and probability according to an implementation of the present disclosure.

In S300, a controller 190 of FIG. 1 may determine whether it is possible to use communication (e.g., wireless-fidelity (Wi-Fi), telematics, or the like) and location information (e.g., a global positioning system (GPS) or the like).

When it is possible to use the communication and the location information, in S310, the controller 190 may predict a minimum outdoor air temperature in an area where a vehicle is parked within a predetermined time (e.g., 48 hours) after turn-off. When using learning data of the vehicle itself, the controller 190 may compare data with a continuous result to change a control strategy. For example, when a maximum time taken for restart is less than 12 hours, the controller 190 may predict and change to a minimum air temperature within 12 hours.

When it is impossible to use the communication and the location information, in S320, the controller 190 may measure a start and stop history and an outside air temperature with respect to a sensor and a control device (e.g., an ECU) loaded into the vehicle. The controller 190 may analyze a restart time and a temperature distribution and probability (or pattern) upon restart in a predetermined unit (e.g., by day, week, or day of the week) shown in FIG. 9 based on the start and stop history measurement value and the outside air temperature measurement value and may learn the analyzed restart time and the analyzed temperature distribution and probability upon the restart in the predetermined unit in control logic.

In S330, the controller 190 may predict an outside air temperature (i.e., an equilibrium temperature) on the basis of the time taken upon restart and the outside air temperature distribution and probability learning value. The controller 190 may select an outside air temperature under an adverse condition expected with the maximum probability based on the learning value. As an example, when an expected restart time is less than 8 hours on Monday through Friday in July, because an expected temperature upon restart is similar to an outside air temperature upon turn-off and there is no reference differential pressure at an expected equilibrium temperature, the controller 190 may determine not to control differential pressure. When the start delay time is less than 2 seconds, the controller 190 may maintain target differential pressure.

As another example, when an expected restart time is greater than or equal to 12 hours on Saturday and Sunday in December, because an expected temperature upon restart is lower than an outside air temperature upon turn-off and there is reference differential pressure at an expected equilibrium temperature, the controller 190 may determine to control differential pressure. When the start delay time is greater than 2 seconds, the controller 190 may change the target differential pressure.

In S340, the controller 190 may set the predicted outside air temperature to the expected equilibrium temperature.

Figure 10:
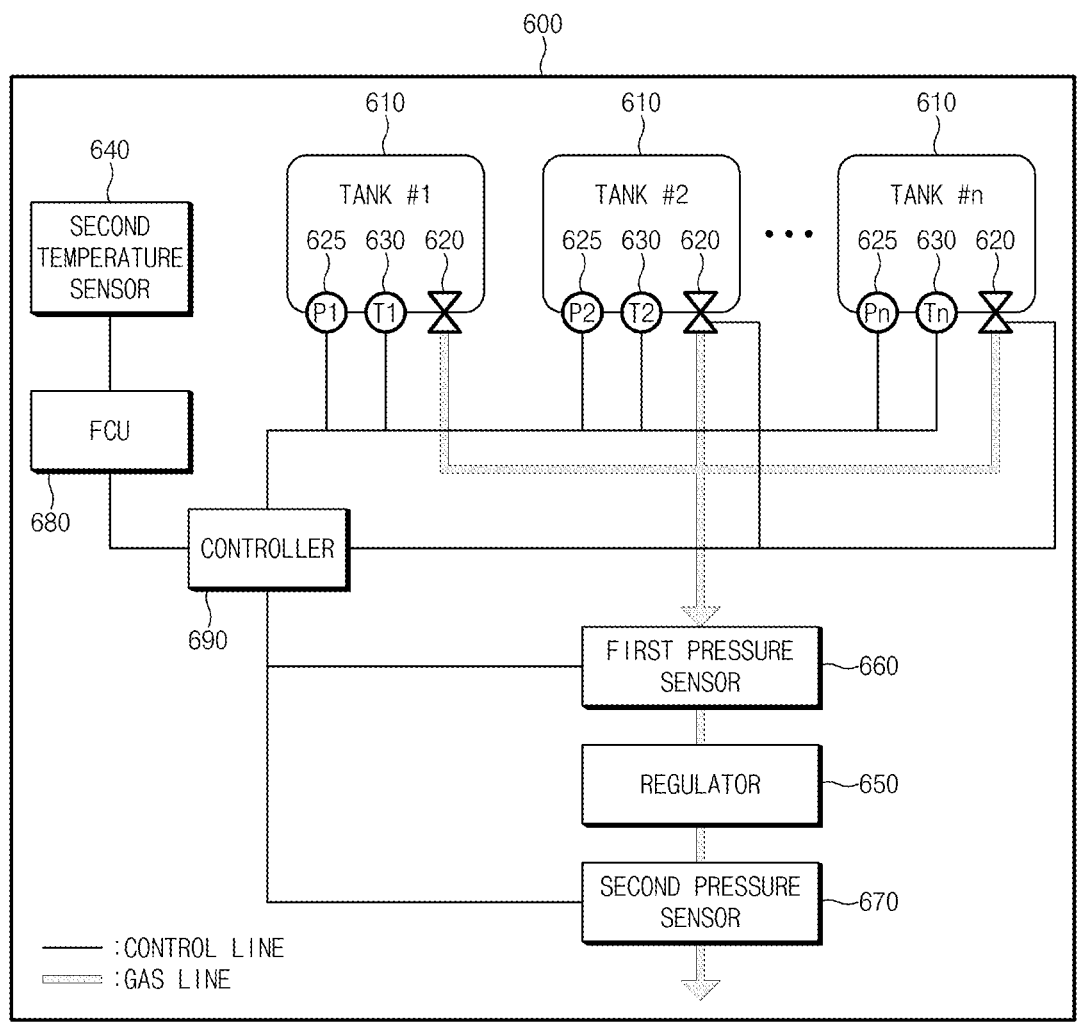
FIG. 10 is a drawing illustrating a configuration of a hydrogen storage system according to another implementation of the present disclosure.

FIG. 10 is a drawing illustrating a configuration of a hydrogen storage system according to another implementation of the present disclosure.

A hydrogen storage system 600 may include a tank 610, a valve 620, a tank pressure sensor 625, a first temperature sensor 630, a second temperature sensor 640, a regulator 650, a first pressure sensor 660, a second pressure sensor 670, a fuel cell control unit (FCU) 680, and a controller 690.

The tank 610 may store hydrogen used as fuel in a fuel cell vehicle. The tank 610 may store hydrogen gas compressed at high pressure. The tank 610 may be made of a carbon fiber reinforced composite capable of withstanding high pressure. The tank 610 may be provided in plural in the hydrogen storage system 600.

The valve 620 may open or block a flow path of hydrogen gas supplied from the tank 610 to a fuel cell stack. The valve 620 may be mounted on an outlet end of the tank 610, which may be closed or opened under an instruction of the controller 690. The valve 620 may be implemented as a solenoid valve.

The tank pressure sensor 625 may be installed in the tank 610 to measure an internal pressure of the tank 610. The tank pressure sensor 625 may transmit the measured pressure information to the controller 690.

The first temperature sensor 630 may be installed in the tank 610 to measure a temperature (or a hydrogen temperature) of hydrogen stored in the tank 610. The first temperature sensor 630 may transmit the measured temperature information to the controller 690. The first temperature sensor 630 may receive continuous power. The first temperature sensor 630 may be used to sense internal overheating of the tank 610 and may identify the amount of fuel when charging hydrogen in the tank 610.

The second sensor 640 may measure an outdoor air temperature. In other words, the second temperature sensor 640 may be installed in the vehicle to measure an external temperature of the vehicle.

The regulator 650 may reduce high-pressure (e.g., 700 bar) hydrogen gas, output from the at least one tank 610, to predetermined low-pressure hydrogen gas. The regulator 650 may be implemented as an HPR. The regulator 650 may supply the reduced hydrogen to the fuel cell stack.

The first pressure sensor 660 may be mounted on pipe (or a fuel supply line) which connects the plurality of tanks 110 with the regulator 650. The first pressure sensor 660 may measure a pressure of hydrogen in the pipe. In other words, the first pressure sensor 660 may measure a pressure of hydrogen (or hydrogen pressure) introduced into the regulator 650. The first pressure sensor 660 may be implemented as an HPS.

The second pressure sensor 670 may be mounted on pipe connected with an output side of the regulator 650. The second pressure sensor 670 may measure a pressure of hydrogen, which is reduced by the regulator 650. The second pressure sensor 670 may be implemented as an MPS.

The FCU 680 may control the overall operation of the fuel cell system. The FCU 680 may transmit a start and stop signal to the controller 690. The FCU 680 may measure an outside air temperature using the second temperature sensor 640. The FCU 680 may transmit the measured outside air temperature to the controller 690. The FCU 680 may include at least one processor and may further include a memory.

The controller 690 may control the overall operation of the hydrogen storage system 600. The controller 690 may be a hydrogen storage system management unit (HMU). The controller 690 may calculate a state of fuel (SOF), a temperature inside and outside the system, a pressure situation, and a pressure deviation. The controller 690 may calculate an SOF using a temperature and pressure of hydrogen and may calculate a temperature and pressure of a tank and pipe area. The controller 690 may calculate an SOF using the mass of hydrogen. Furthermore, the controller 690 may calculate pressure inside and outside the system and the SOF based on a change in hydrogen temperature.

The controller 690 may include at least one processor. The at least one processor may include at least one of processing devices such as an ASIC, a DSP, a PLD, an FPGA, a CPU, a microcontroller, or a microprocessor. Furthermore, the controller 690 may include a memory. The memory may be a non-transitory storage medium which stores instructions executed by the at least one processor. The memory may include as at least one of storage media such as a flash memory, a hard disk, an SSD, an SD card, a RAM, an SRAM, a ROM, a PROM, an EEPROM, or an EPROM. The memory may store control logic for restricting differential pressure from being generated in the hydrogen storage system 600.

When pressure in the hydrogen storage system 600 is equal when opening the valve 620, the controller 690 may calculate an SOF using experimental values measured by the first temperature sensor 630 and the first pressure sensor 660. As another implementation, the controller 690 may indirectly calculate an SOF using experimental value measured by the tank pressure sensor 625 and the first pressure sensor 660.

Furthermore, the controller 690 may monitor a temperature for each tank using the first temperature sensor 630 while charging fuel in the tank 610 or using the tank 610. As another implementation, because of calculating a tank temperature based on tank pressure measured by the tank pressure sensor 625, the controller 690 may monitor a temperature for each tank. When overheating is detected in at least one tank, the controller 690 may stop charging. The controller 690 may detect abnormality in the tank based on a difference in temperature for each tank.

The controller 690 may compare amounts of states of the hydrogen storage system 600 when the starting of the fuel cell is turned off to determine whether differential pressure is generated and may predict a possibility that differential will be generated to induce pressure equilibrium. At this time, there should be no failure in pressure sensor, tank valve, and temperature sensor, and the SOF, that is, the remaining amount of hydrogen should be greater than or equal to a predetermined certain level.

The controller 690 may identify pressure and a high-pressure sensor for each tank when a turn-off signal is received and may calculate a pressure difference (or differential pressure) between the tank 610 and the pipe. The controller 690 may predict (or estimate) differential pressure between the tanks 610 upon temperature equilibrium before next start based on the outside air temperature. When the predicted differential pressure between the tanks 610 is in a valve opening impossible condition upon next driving, the controller 690 may operate the valve 620 and the regulator 650 to perform pressure equilibrium and may induce turn-off.

In detail, the controller 690 may receive a turn-off signal (or a stop signal) from the FCU 680. When the turn-off signal is received, the controller 690 may perform a predetermined turn-off process. In other words, the controller 690 may stop supplying fuel (or hydrogen) to the fuel cell stack depending on the turn-off process. At this time, the controller 690 may output (or display) a notification for notifying a user of it to a cluster. For example, the controller 690 may output the message "Preparing to turn off, complete after ○○ seconds" to the cluster.

Furthermore, the controller 690 may switch the valves 620 respectively mounted on the tanks 610 from an open state to a closed state. In other words, when receiving the turn-off signal, the controller 690 may close the opened valves 620.

The controller 690 may measure pressure for each tank using the tank pressure sensor 625. Furthermore, the controller 690 may measure pipe pressure using the first pressure sensor 660.

The controller 690 may compare the pressure for each tank with the pipe pressure to determine whether to execute the re-formation of the same pressure. Herein, the re-formation of the same pressure may be defined as pressure equilibrium control of matching the tank pressure with the pipe pressure to be the same as each other. When a pressure difference between the at least one of the plurality of tanks 610 and the pipe is greater than or equal to predetermined reference pressure (e.g., 5 bar), the controller 690 may determine to execute the re-formation of the same pressure. When the pressure difference is less than the reference pressure, the controller 690 may determine not to execute the re-formation of the same pressure. Herein, the pressure difference may be a value obtained by subtracting the pipe pressure from the tank pressure.

When it is determined to execute the re-formation of the same pressure, the controller 690 may open the valve 620 of the tank 610, in which the difference over the reference pressure is generated with the pipe pressure, during a predetermined time (e.g., 3 seconds) to execute the re-formation of the same pressure. At this time, the controller 690 may execute the re-formation of the same pressure in an order from a tank having relatively low temperature and high pressure and a tank having relatively high temperature and low pressure. After executing the re-formation of the same pressure, the controller 690 may close the tank valve.

The controller 690 may perform calibration of calibrating drift (or an offset) which is generated between the tank pressure sensor 625 and the first pressure sensor 660. In other words, when values measured by the tank pressure sensor 625 and the first pressure sensor 660 are different from each other although internal pressure of the system 600 is the same pressure, the controller 690 may reflect a difference between the values measured by the tank pressure sensor 625 and the first pressure sensor 660 as a sensor offset (i.e., an offset of the tank pressure sensor 625 with respect to the first pressure sensor 660).

The controller 690 may determine whether it is expected to generate differential pressure between tanks on the basis of the expected equilibrium temperature (e.g., the outdoor air temperature). The controller 690 may reflect a sensor offset when calculating expected pressure for each tank in the expected equilibrium temperature. The controller 690 may determine whether the expected differential pressure between tanks is less than predetermined target differential pressure (15 bar) in the expected equilibrium temperature. Herein, the expected equilibrium temperature may be a temperature expected to be temperature equilibrium of hydrogen gas in the hydrogen storage system 600. A drift value C compared to a forecast outside air temperature A of a parked area/a statistically predicted outside air temperature B learned based on a usage pattern with regard to A, B, or insulation and heat conduction of the system itself may be used as the expected equilibrium temperature. When there is a long time until restart after a shutdown (S/D), C may be equal to A or may be equal to B. The controller 690 may set an initial setting value of target differential pressure to 20% or less of an actual management goal (i.e., a hardware drivable range) to learn a direction where the target differential pressure is completed (or high).

When the expected differential pressure is less than the target differential pressure, the controller 690 may perform turn-off and may output a notification for notifying a user of the turn-off to the cluster. For example, the controller 690 may display the message "The engine is off." on the cluster.

Thereafter, upon restart, the controller 690 may determine whether a start delay time is greater than a predetermined reference time (e.g., 2 seconds). When the start delay time is not greater than the reference time, the controller 690 may maintain the target differential pressure.

When the start delay time is greater than the predetermined reference time, the controller 690 may determine whether an outside air temperature reaches the expected equilibrium temperature upon restart.

When it is determined that the outside air temperature reaches the expected equilibrium temperature upon the restart, the controller 690 may reinforce the target differential pressure. At this time, the controller 690 may set the target differential pressure to be lower than current target differential pressure.

When it is determined that the outside air temperature does not reach the expected equilibrium temperature upon the restart, the controller 690 may relieve the target differential pressure. At this time, the controller 690 may set the target differential pressure to be higher than the current target differential pressure.

Figure 11:
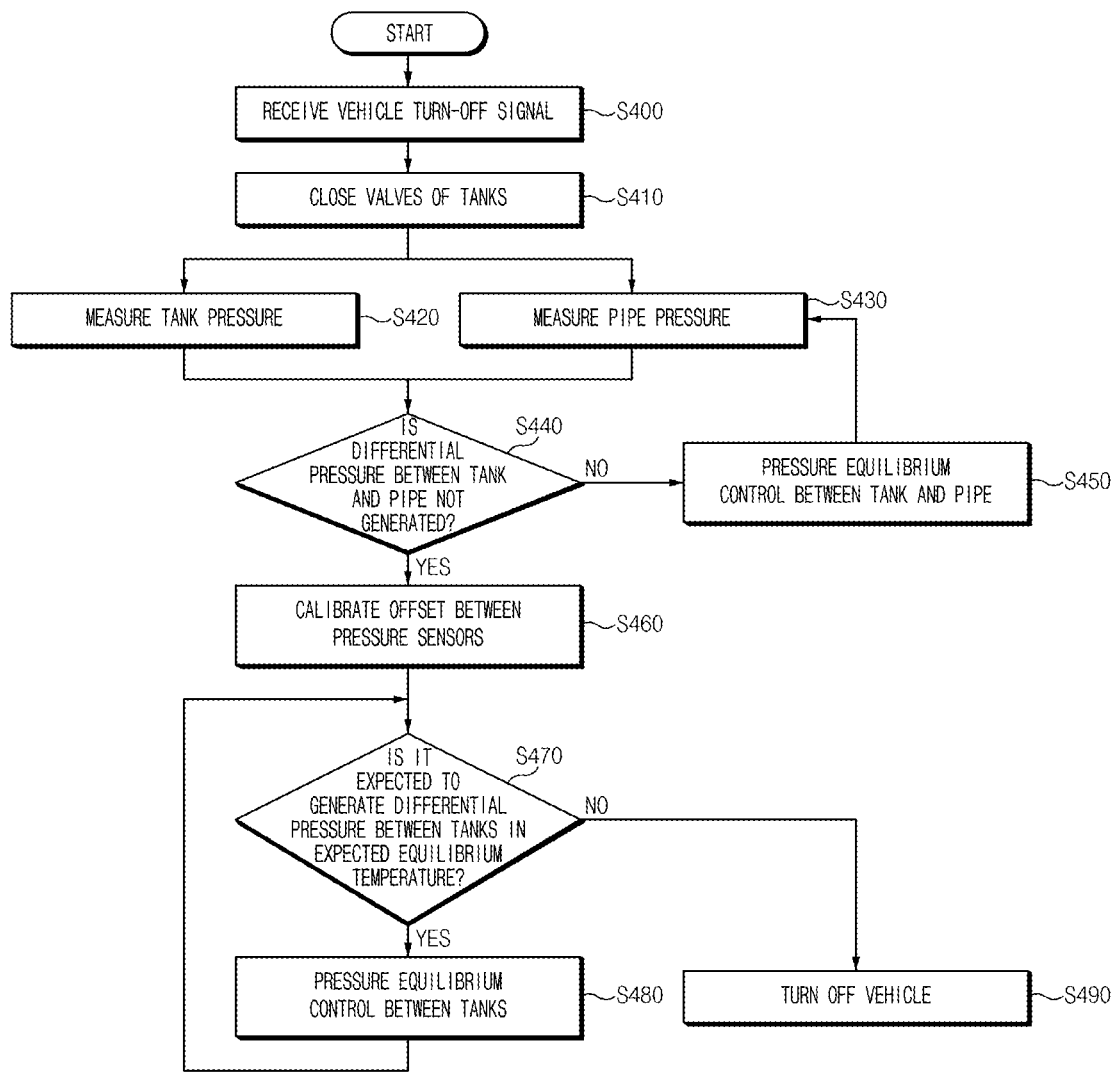
FIG. 11 is a flowchart illustrating a method for adjusting differential pressure in a hydrogen storage system according to another implementation of the present disclosure.

FIG. 11 is a flowchart illustrating a method for adjusting differential pressure in a hydrogen storage system according to another implementation of the present disclosure.

In S400, a controller 690 of FIG. 10 may receive a turn-off signal transmitted from an FCU 680 of FIG. 10. When the turn-off signal is received, the controller 690 may output a notification for notifying a user of it to a cluster. For example, the controller 690 may display the message "Preparing to turn off, complete after ○○ seconds" on the cluster.

When the turn-off signal is received, in S410, the controller 690 may close valves 620 of a plurality of tanks 610 of FIG. 10. In other words, the controller 690 may switch the valves 620 of the plurality of tanks 610 from an open state to a closed state.

In S420, the controller 690 may measure pressure for each tank using a tank pressure sensor 625 of FIG. 10, which is mounted on each tank 610.

In S430, the controller 690 may measure pipe pressure using a first pressure sensor 660 of FIG. 10, which is installed in pipe.

In S440, the controller 690 may compare a pressure of each tank 610 with a pressure of the pipe to determine whether differential pressure between the tank 610 and the pipe is generated. In other words, the controller 690 may compare a pressure of each tank 610 with a pressure of the pipe to determine whether to execute the re-formation of the same pressure (or pressure equilibrium control) between the tank 610 and the pipe. When differential pressure between at least one of the plurality of tanks 610 and the pipe is greater than or equal to predetermined reference pressure (e.g., 5 bar), the controller 690 may determine that the differential pressure between the tank and the pipe is generated to determine to execute the re-formation of the same pressure. When the differential pressure is less than the reference pressure, the controller 690 may determine that the differential pressure between the tank and the pipe is not generated to determine not to execute the re-formation of the same pressure. Herein, the differential pressure may be a value obtained by subtracting the pipe pressure from the tank pressure.

When it is determined that the differential pressure between the tank and the pipe is generated, in S450, the controller 690 may independently control a value of the tank in which the differential pressure with the pipe is generated and may execute the re-formation of the same pressure (or pressure equilibrium control). At this time, the controller 690 may execute the re-formation of the same pressure in an order from a tank having relatively low temperature and high pressure and a tank having relatively high temperature and low pressure. At this time, the controller 690 may open and close a tank valve during a predetermined time.

In S460, the controller 690 may perform calibration between pressure sensors. When an output value (i.e., pipe pressure) of the first pressure sensor 660 is 500 bar, when an output value of a pressure sensor of tank #1 is 503 bar, when an output value of a pressure sensor of tank #2 is 502 bar, and when an output value of a pressure sensor of tank #3 is 500 bar, the controller 690 may set offsets of the pressure sensor of tank #1, the pressure sensor of tank #2, and the pressure sensor of tank #3 to 3 bar, 2 bar, and 0 bar, respectively.

In S470, the controller 690 may determine whether it is expected to generate differential pressure between tanks in an expected equilibrium temperature. The controller 690 may reflect a sensor offset to calculate expected pressure for each tank in the expected equilibrium temperature. For example, when pressures of tank #1, tank #2, and tank #3 in the expected equilibrium temperature are respectively expected as 492 bar, 485 bar, and 480 bar, the controller 690 may reflect sensor offsets −3 bar, −2 bar, and −0 bar in expected pressures of tank #1, tank #2, and tank #3, respectively, to calculate expected final pressures 489 bar, 483 bar, and 480 bar of tank #1, tank #2, and tank #3. The controller 690 may determine whether the expected differential pressure between tanks is less than predetermined target differential pressure (e.g., 15 bar) in the expected equilibrium temperature. Herein, the expected equilibrium temperature may be a temperature expected to be temperature equilibrium of gas in the system. A drift value C compared to a forecast outside air temperature A of a parked area/a statistically predicted outside air temperature B learned based on a usage pattern with regard to A, B, or insulation and heat conduction of the system itself may be used as the expected equilibrium temperature. When there is a long time until restart after a shutdown (S/D), C may be equal to A or may be equal to B.

When it is expected to generate the differential pressure between the tanks in the expected equilibrium temperature, in S480, the controller 690 may execute pressure equilibrium control between tanks. When the expected differential pressure is greater than or equal to the target differential pressure, the controller 690 may open a valve 620 of a tank expected to generate differential pressure between tanks (or a tank having relatively high pressure among tanks in which differential pressure is generated) and may operate a regulator 650 of FIG. 10 to exhaust (or release) hydrogen of the tank, thus restricting differential pressure from being generated.

When it is expected not to generate the differential pressure between the tanks in the expected equilibrium temperature, in S490, the controller 690 may execute turn-off. When the expected differential pressure is less than the target differential pressure, the controller 690 may perform turn-off and may output a notification for notifying a user of the turn-off to the cluster. For example, the controller 690 may display the message "The engine is off." on the cluster.

Implementations of the present disclosure may identify a temperature and pressure for each part of the system while the fuel cell is operating, may independently control a value for each tank before the operation of the fuel cell is ended when differential pressure in the system is detected and expected, and may relieve differential pressure by releasing hydrogen through a regulator, thus ensuring a state where it is possible to stably start a next operation.

Furthermore, implementations of the present disclosure may restrict differential pressure from being generated in a hydrogen storage system by means of control logic without changing a part and increasing cost, thus improving vehicle availability.

Furthermore, implementations of the present disclosure may restrict differential pressure relief noise (or an airflow sound) from being generated upon restart.

Hereinabove, although the present disclosure has been described with reference to exemplary implementations and the accompanying drawings, the present disclosure is not limited thereto, but may be variously modified and altered by those skilled in the art to which the present disclosure pertains without departing from the spirit and scope of the present disclosure claimed in the following claims. Therefore, implementations of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A hydrogen storage system, comprising:
   a controller configured to control valves of a plurality of tanks,
   wherein the controller is configured to:
   measure tank pressure of each of the plurality of tanks,
   measure pipe pressure of a pipe connected with the plurality of tanks,
   determine whether first differential pressure occurs between the pipe and each of the plurality of tanks by comparing the pipe pressure with the tank pressure,
   based on determining that the first differential pressure is equal to or less than a threshold, determine whether second differential pressure among the plurality of tanks is expected in an expected equilibrium temperature, and
   based on determining that the second differential pressure is expected, perform a pressure equilibrium control between the plurality of tanks.

2. The hydrogen storage system of claim 1, wherein the controller is configured to:
   measure a temperature at each of the plurality of tanks using a temperature sensor mounted at each of the plurality of tanks, and
   convert the temperature into the tank pressure based on temperature-pressure conversion data.

3. The hydrogen storage system of claim 1, wherein the controller is configured to:
   based on a pressure difference between at least one of the plurality of tanks and the pipe being greater than or equal to a reference value, determine that the first differential pressure occurs, and
   based on a pressure difference between the pipe and each of the plurality of tanks being less than the reference value, determine that the first differential pressure does not occur.

4. The hydrogen storage system of claim 3, wherein the controller is configured to, based on determining that the first differential pressure occurs, open a valve connected to the at least one of the plurality of tanks for a predetermined time and close the valve to thereby equalize a pressure of the at least one of the plurality of tanks and a pressure of the pipe,
   wherein the valve is opened and closed at least once.

5. The hydrogen storage system of claim 3, wherein the plurality of tanks includes a first tank having a relatively low temperature and a relatively high pressure and a second tank having a relatively high temperature and a relatively low pressure, and
   wherein the controller is configured to, based on determining that the first differential pressure occurs for two or more of the plurality of tanks, independently control a valve connected to the first tank and a valve connected to the second tank in order, thereby equalizing pressures of the first and second tanks and a pressure of the pipe.

6. The hydrogen storage system of claim 1, wherein the controller is configured to:
   calculate a temperature for each of the plurality of tanks in the expected equilibrium temperature,
   calculate a pressure difference among the plurality of tanks based on the temperature for each of the plurality of tanks in the expected equilibrium temperature,
   determine whether the calculated pressure difference is greater than or equal to target differential pressure,
   based on the calculated pressure difference being greater than or equal to the target differential pressure, independently control a valve of a tank having expectation of a relatively high pressure to thereby release hydrogen, and
   based on the calculated pressure difference being less than the target differential pressure, perform a turn-off of the hydrogen storage system.

7. The hydrogen storage system of claim 6, wherein the controller is configured to:
   based on restarting the hydrogen storage system after the turn-off, determine whether a start delay time is greater than a predetermined reference time, and
   based on the start delay time being not greater than the reference time, maintain the target differential pressure.

8. The hydrogen storage system of claim 7, wherein the controller is configured to:
   based on the start delay time being greater than the reference time, determine whether an outside air temperature reaches the expected equilibrium temperature, when
   based on the outside air temperature reaching the expected equilibrium temperature, reinforce the target differential pressure, and
   based on the outside air temperature not reaching the expected equilibrium temperature, relieve the target differential pressure.

9. The hydrogen storage system of claim 1, wherein the controller is configured to set (i) a forecast outside air temperature at a parked area or (ii) a statistically predicted outside air temperature learned based on a user pattern, to the expected equilibrium temperature.

10. The hydrogen storage system of claim 1, wherein the controller is configured to measure the pressure of each of the plurality of tanks using a pressure sensor connected to each of the plurality of tanks.

11. A method for adjusting differential pressure in a hydrogen storage system, the method comprising:
    closing, using a controller, valves of a plurality of tanks, based on receiving a turn-off signal;
    measuring, using the controller, pressure of each of the plurality of tanks;
    measuring, using the controller, a pipe pressure of a pipe connected with the plurality of tanks;
    comparing, using the controller, the pressure of each of the plurality of tanks with the pipe pressure to determine whether first differential pressure between the plurality of tanks and the pipe occurs;

based on determining that the differential pressure between the plurality of tanks and the pipe does not occur, determining, using the controller, whether second differential pressure between the plurality of tanks is expected in an expected equilibrium temperature; and based on determining that the second differential pressure is expected, performing, using the controller, pressure equilibrium control between the plurality of tanks.

12. The method of claim 11, wherein measuring the pressure for each of the plurality of tanks includes:

measuring, using the controller, a temperature for each of the plurality of tanks using a temperature sensor for each of the plurality of tanks; and converting, using the controller, the temperature for each of the plurality of tanks into the pressure for each of the plurality of tanks using temperature-pressure conversion data.

13. The method of claim 11, wherein determining whether the first differential pressure occurs includes:

based on a pressure difference between at least one of the plurality of tanks and the pipe being greater than or equal to a reference value, determining, using the controller, that the first differential pressure occurs; and based on a pressure difference between the pipe and each of the plurality of tanks being less than the reference value, determining, using the controller, that the first differential pressure does not occur.

14. The method of claim 13, further comprising:

based on determining that the first differential pressure occurs, performing, using the controller, open a valve connected to the at least one of the plurality of tanks during a predetermined time and close the valve to thereby equalize a pressure of the at least one of the plurality of tanks and a pressure of the pipe, and wherein the valve is opened and closed at least once.

15. The method of claim 13, wherein the plurality of tanks includes a first tank having a relatively low temperature and a relatively high pressure and a second tank having a relatively high temperature and a relatively low pressure, and wherein the method further comprises:

based on determining that the first differential pressure occurs for two or more of the plurality of tanks, independently controlling, using the controller, a valve connected to the first tank and a valve connected to the second tank in order, thereby equalizing pressures of the first and second tanks and a pressure of the pipe.

16. The method of claim 11, wherein determining whether the second differential pressure is expected includes:

calculating, using the controller, a temperature for each of the plurality of tanks in the expected equilibrium temperature;

calculating, using the controller, a pressure difference between the plurality of tanks based on the temperature for each of the plurality of tanks in the expected equilibrium temperature;

determining, using the controller, whether the calculated pressure difference is greater than or equal to target differential pressure;

based on the calculated pressure difference being greater than or equal to the target differential pressure, independently controlling, using the controller, a valve of a tank having expectation of a relatively high pressure to thereby release hydrogen; and based on the calculated pressure difference being less than the target differential pressure, performing, using the controller, a turn-off of the hydrogen storage system.

17. The method of claim 16, further comprising:

based on restarting the hydrogen storage system after the turn-off, determining, using the controller, whether a start delay time is greater than a predetermined reference time; and based on the start delay time being not greater than the reference time, maintaining, using the controller, the target differential pressure.

18. The method of claim 17, further comprising:

based on the start delay time being greater than the reference time, determining, using the controller, whether an outside air temperature reaches the expected equilibrium temperature;

based on the outside air temperature reaching the expected equilibrium temperature, reinforcing, using the controller, the target differential pressure; and based on the outside air temperature not reaching the expected equilibrium temperature, relieving, using the controller, the target differential pressure.

19. The method of claim 11, wherein determining whether the second differential pressure is expected includes:

setting (i) a forecast outside air temperature of a parked area or (ii) a statistically predicted outside air temperature learned based on a user pattern, to the expected equilibrium temperature.

20. The method of claim 11, wherein measuring the pressure of each of the plurality of tanks includes:

measuring the pressure of each of the plurality of tanks using a pressure sensor connected to each of the plurality of tanks.

* * * * *